US008871695B2

(12) United States Patent
Quintero et al.

(10) Patent No.: US 8,871,695 B2
(45) Date of Patent: Oct. 28, 2014

(54) IN SITU MICROEMULSIONS USED AS SPACER FLUIDS

(75) Inventors: Lirio Quintero, Houston, TX (US); Chad F. Christian, Houston, TX (US); Alexander McKellar, The Woodlands, TX (US); Cristina Torres, The Woodlands, TX (US); David E. Clark, Humble, TX (US); Thomas A. Jones, Cypress, TX (US)

(73) Assignee: Baker Hughes Incorporated, Houston, TX (US)

( * ) Notice: Subject to any disclaimer, the term of this patent is extended or adjusted under 35 U.S.C. 154(b) by 569 days.

(21) Appl. No.: 12/107,185

(22) Filed: Apr. 22, 2008

(65) Prior Publication Data

US 2008/0274918 A1  Nov. 6, 2008

Related U.S. Application Data

(60) Provisional application No. 60/913,969, filed on Apr. 25, 2007.

(51) Int. Cl.
*C09K 8/08* (2006.01)
*C09K 8/524* (2006.01)
*C09K 8/52* (2006.01)

(52) U.S. Cl.
CPC .. *C09K 8/52* (2013.01); *C09K 8/524* (2013.01)
USPC .......... 507/261; 507/116; 507/135; 507/136; 507/240; 507/245; 507/247; 507/255; 507/259

(58) Field of Classification Search
None
See application file for complete search history.

(56) References Cited

U.S. PATENT DOCUMENTS

| 2,882,973 | A | * | 4/1959 | Doscher et al. ............... 166/266 |
| 3,050,141 | A | * | 8/1962 | Lummus et al. ................ 175/41 |
| 3,504,744 | A | | 4/1970 | Davis, Jr. et al. |
| 4,017,405 | A | * | 4/1977 | Holm ............................ 507/254 |
| 4,125,156 | A | | 11/1978 | Glinsmann |
| 5,008,026 | A | | 4/1991 | Gardner et al. |

(Continued)

FOREIGN PATENT DOCUMENTS

| GB | 2347682 A | 9/2000 |
| WO | WO0100747 A | 1/2001 |

(Continued)

OTHER PUBLICATIONS

M. Miñana-Perez, et al., "Solubilization of Polar Oils with Extended Surfactants," Colloids and Surfaces A: Physicochemical and Engineering Aspects, 1995, pp. 217-224, vol. 100.

(Continued)

*Primary Examiner* — John J Figueroa
(74) *Attorney, Agent, or Firm* — Mossman Kumar & Tyler PC

(57) ABSTRACT

Nanoemulsions, miniemulsions, microemulsion systems with excess oil or water or both (Winsor III) or single phase microemulsions (Winsor IV) may be formed in situ during hydrocarbon recovery operations after drilling with OBM or SBM using one or more fluid pills. The nanoemulsions, miniemulsions, microemulsion systems with excess oil or water or both or single phase microemulsions remove oil and solids from the well and wellbore surfaces. In one non-limiting embodiment, a single phase microemulsion (SPME) or other in situ-formed fluid may be created from a polar phase, a nonpolar phase, at least one viscosifier, and at least one surfactant.

15 Claims, 2 Drawing Sheets

(56) References Cited

U.S. PATENT DOCUMENTS

| | | | |
|---|---|---|---|
| 5,341,882 A * | 8/1994 | Hale | 166/293 |
| 5,370,185 A * | 12/1994 | Cowan et al. | 166/293 |
| 5,374,361 A | 12/1994 | Chan | |
| 5,830,831 A | 11/1998 | Chan et al. | |
| 5,874,386 A | 2/1999 | Chan et al. | |
| 6,022,833 A * | 2/2000 | Mueller et al. | 507/203 |
| 6,022,834 A | 2/2000 | Hsu et al. | |
| 6,090,754 A | 7/2000 | Chan et al. | |
| 6,165,946 A * | 12/2000 | Mueller et al. | 507/203 |
| 6,581,687 B2 | 6/2003 | Collins et al. | |
| 6,593,279 B2 * | 7/2003 | Von Krosigk et al. | 507/267 |
| 6,613,720 B1 | 9/2003 | Feraud et al. | |
| 6,631,764 B2 * | 10/2003 | Parlar et al. | 166/278 |
| 6,672,388 B2 | 1/2004 | McGregor et al. | |
| 6,691,805 B2 * | 2/2004 | Thaemlitz | 175/65 |
| 7,833,943 B2 | 11/2010 | Van Zanten et al. | |
| 2003/0006040 A1 | 1/2003 | McGregor et al. | |
| 2003/0165472 A1 | 9/2003 | McGrath et al. | |
| 2003/0178230 A1 | 9/2003 | Audibert Hayet et al. | |
| 2004/0063795 A1 | 4/2004 | Von Krosigk et al. | |
| 2004/0127749 A1 | 7/2004 | Harrison et al. | |
| 2004/0147404 A1 | 7/2004 | Thaemlitz et al. | |
| 2006/0073986 A1 | 4/2006 | Jones et al. | |
| 2006/0096757 A1 | 5/2006 | Berry et al. | |
| 2006/0211593 A1 | 9/2006 | Smith et al. | |
| 2006/0258541 A1 | 11/2006 | Crews | |
| 2007/0295368 A1 * | 12/2007 | Harrison et al. | 134/42 |
| 2008/0076682 A1 | 3/2008 | Jones et al. | |
| 2008/0110618 A1 | 5/2008 | Quintero et al. | |
| 2008/0173451 A1 * | 7/2008 | Reddy et al. | 166/308.2 |

FOREIGN PATENT DOCUMENTS

| | | |
|---|---|---|
| WO | 2006109016 A1 | 10/2006 |
| WO | 2006120151 A2 | 11/2006 |
| WO | 2008045734 A2 | 4/2008 |

OTHER PUBLICATIONS

M. Miñana-Perez, et al., "Solbilization of Polar Oils in Microemulsion Systems," Progr. Colloid Polym. Sci., 1995, pp. 177-179, vol. 98.

J. Salager, et al., "Chapter 8: Ionic Microemulsions," P.Kumar, et al. Handbook of Microemulsion Science and Technology, 1999, pp. 247-280, Marcel Dekker, New York.

G. Penny, et al., "The Application of Microemulsion Additives in Drilling and Stimulation Results in Enhanced Gas Production," SPE 94274, 2005 SPE Production and Operations Symposium, Apr. 17-19, 2005, pp. 1-9, Oklahoma City, Oklahoma.

L. Quintero, et al., "One-Step Acid Removal of an Invert Emulsion," SPE 94604, SPE 6th European Formation Damage Conference, May 25-27, 2005, pp. 1-9, Scheveningen, The Netherlands.

Van Zanten et al., "Surfactant Nanotechnology Offers New Method for Removing Oil-Based Mud Residue to Achieve Fast, Effective Wellbore Cleaning and Remediation," SPE 127884, SPE Int'l Symposium and Exhibition on Formation Damage Control, Lafayette, LA (Feb. 10-12, 2010).

J. Harrison; "Microemulsion Technology for Surfactants," Specialty Chemicals Magazine, Nov. 2004, pp. 32, 34, 36.

* cited by examiner

IN SITU MICROEMULSIONS USED AS SPACER FLUIDS

CROSS-REFERENCE TO RELATED APPLICATION

This application claims the benefit of U.S. Provisional Patent Application No. 60/913,969 filed on Apr. 25, 2007.

TECHNICAL FIELD

The present invention relates to methods and compositions for removing or cleaning up oil-based drilling fluids (OBM) or synthetic-based drilling fluids (SBM) from a wellbore after oil well drilling, and more particularly relates, in one non-limiting embodiment, to methods and compositions for removing or cleaning up OBM, SBM and other contaminants from a wellbore using nanoemulsion, miniemulsions, microemulsions systems in equilibrium with excess oil or water, or both (Winsor III) or single phase microemulsions (Winsor IV) formed in situ in a fluid pill.

BACKGROUND

Drilling fluids used in the drilling of subterranean oil and gas wells along with other drilling fluid applications and drilling procedures are well known. In rotary drilling there are a variety of functions and characteristics that are expected of drilling fluids, also known as drilling muds, or simply "muds". The drilling fluid should carry cuttings and other particulates from beneath the bit, transport them through the annulus, and allow their separation at the surface while at the same time the rotary bit is cooled and cleaned. A drilling mud is also intended to reduce friction between the drill string and the sides of the hole while maintaining the stability of uncased sections of the borehole. The drilling fluid is formulated to prevent unwanted influxes of formation fluids from permeable rocks penetrated. The drilling fluid may also be used to collect and interpret information available from drill cuttings, cores and electrical logs. It will be appreciated that within the scope of the claimed invention herein, the term "drilling fluid" also encompasses "drill-in fluids" and "completion fluids".

Drilling fluids are typically classified according to their base fluid. In water-based muds, solid particles are suspended in water or brine. Oil can be emulsified in the water. Nonetheless, the water is the continuous phase. Brine-based drilling fluids, of course are a water-based mud (WBM) in which the aqueous component is brine. Oil-based muds (OBM) are the opposite or inverse. Solid particles are suspended in oil, and water or brine is emulsified in the oil and therefore the oil is the continuous phase. Oil-based muds can be either all-oil based or water-in-oil macroemulsions, which are also called invert emulsions. In oil-based mud the oil can consist of any oil that may include, but is not limited to, diesel, mineral oil, esters, or alpha-olefins. If the oil is synthesized as compared to being produced by conventional refining techniques, the mud is a synthetic-based mud or SBM. The non-aqueous muds may be referred to as a class by the short-hand O/SBM.

It is apparent to those selecting or using a drilling fluid for oil and/or gas exploration that an essential component of a selected fluid is that it be properly balanced to achieve the necessary characteristics for the specific end application. Because drilling fluids are called upon to perform a number of tasks simultaneously, this desirable balance is not always easy to achieve.

A spacer fluid is a liquid used to physically separate one special-purpose liquid from another. Special-purpose liquids are typically subject to contamination, so a spacer fluid compatible with each is used between the two. A common spacer fluid is simply water, but solvent-based spacers and spacers that contain a majority of mutual solvents are also typical. However, other chemicals are often added to enhance the fluid's performance for the particular operation. Spacers are used primarily when changing mud types or changing from mud to a completion fluid. In the former, an oil-based fluid must be kept separate from a water-based fluid. The other common use of spacers is to separate mud from cement during cementing operations. For cementing, a chemically treated aqueous spacer or sequence of spacers usually separates drilling mud from the cement slurry subsequently pumped downhole. Cleaning spacers are also extensively used to clean the casing, riser and other equipment after drilling a section of wellbore. Cleaning spacers not only remove the remaining drilling fluid from the wellbore, but also cuttings, weighting agent particles, e.g. barite, and other residual oily debris and contaminants.

Indeed, displacement of the drilling or drill-in fluid to become clear brine in the wellbore has become a very important process in the overall well bore completions program leading to optimized hydrocarbon recovery. Poor displacement can lead to less than planned production rates due to formation damage due to mud residue deposits left on wellbore surfaces, including metal and/or formation faces. Other consequences of an inefficient displacement include stuck packers, completion tool setting problems, increased rig and filtration time, increased disposal costs, and increased corrosion pitting. Displacement fluids and spacers typically contain at least one surfactant, optionally at least one viscosifier, and are designed to be as close to "plug flow" or laminar flow as possible. On the other hand, some spacers are designed to provide turbulent flow to further scour away oil and oily debris. They may be used to displace both O/SBM and WBM.

It would be desirable if compositions and methods could be devised to aid and improve the ability to clean up residual OBM, SBM, and any debris or other contaminants, and to remove them more completely, without causing additional formation damage.

SUMMARY

There is provided, in one non-limiting form, a method of removing at least a portion of oil-based mud or synthetic-based mud (O/SBM) from a wellbore that involves drilling a wellbore in a hydrocarbon reservoir with an O/SBM. A fluid pill is pumped into the wellbore, where the fluid pill contains at least one surfactant, optionally at least one viscosifier, and water or brine. The required density of the pill is obtained by the addition of a densifier, such as barite. Once the pill is pumped downhole and comes into contact with OBM, the oil and oily components of the OBM are emulsified into the spacer forming an in situ emulsion in the wellbore. The emulsion contacts O/SBM and substantially removes it from the wellbore. Particulates, and other debris, may also be removed by this method. The method herein is expected to find particular use in providing improved cleaning pills for cleaning casings, risers and other downhole equipment, spacer fluids, displacement fluids, and the like, in addition to preparing for a cementing operation.

In one non-limiting embodiment, at least two serially pumped pills are used. A first fluid pill is pumped into the wellbore, where the first fluid pill is a drive weighted spacer that contains at least one weighting agent, at least one surfactant, at least one viscosifier, and water or brine. Brine is defined herein as water containing one or more salt; the term "brine" is defined as including seawater. A second fluid pill is pumped into the wellbore subsequent to the first fluid pill. The second fluid pill includes at least one surfactant, water or brine (that is, water containing a salt, e.g. seawater). Again, when these pills contact the O/SBM, an emulsion is formed in situ in the wellbore with the residual OBM encountered in the wellbore. The first and/or second fluid pill may also contain an optional co-surfactant. The surfactant in the second fluid pill may be the same or different from the surfactant in the first fluid pill. An additional attribute of the two pills is that they change the wettability of the surface from oil-wet to water-wet.

There is additionally provided in an alternate embodiment a thermodynamically stable, macroscopically homogeneous, single phase microemulsion (SPME) that includes a polar phase, a nonpolar phase, surfactant, in one non-limiting instance a polyglycerol ester surfactant, and at least one viscosifier.

DETAILED DESCRIPTION

Figure 1:
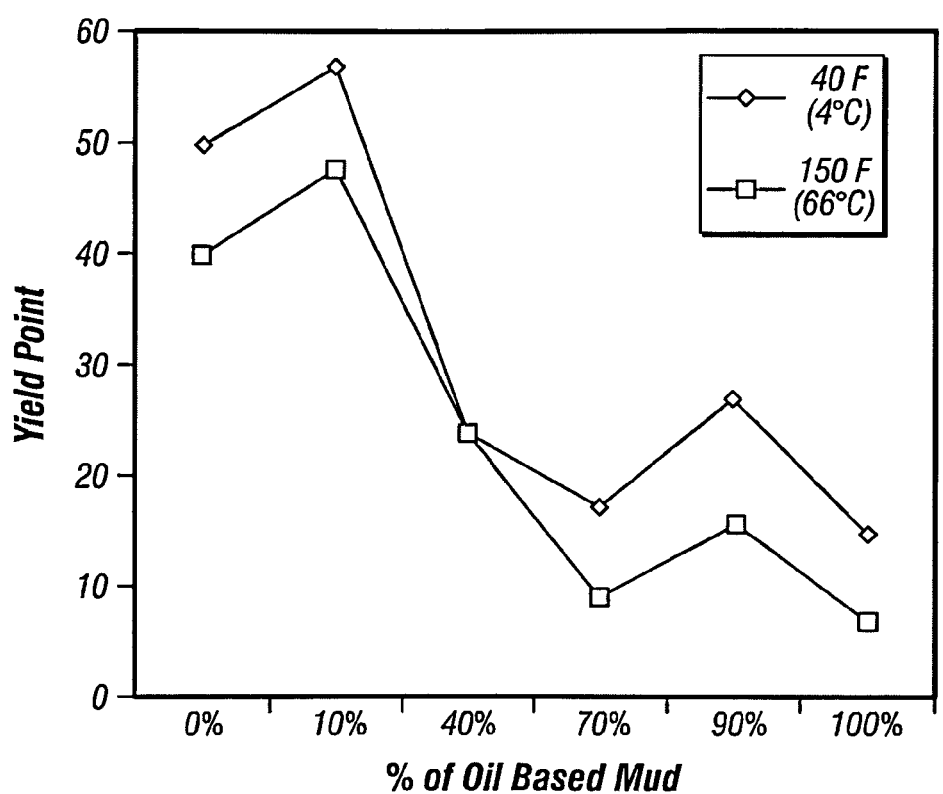
FIG. 1 is a plot of yield point as a function of composition for blends of an oil based mud with Displacement Spacer A at two different temperatures.

Methods and compositions have been discovered for the displacement and clean up of oil- or synthetic-based drilling fluids, along with other wellbore contaminants from the well and wellbore surfaces, including residual oily debris, by using an in situ-generated emulsion, particularly a microemulsion. The wellbore is cleaned by a system of one or more serially pumped fluid pills or spacers that form an in situ emulsion, miniemulsion, microemulsion or nanoemulsion. In one non-limiting embodiment miniemulsions, microemulsions, nanoemulsions, and single phase emulsions, have been found to be particularly useful.

In a system of two serially pumped pills or spacers, the first fluid pill is a weighted drive spacer having a single surfactant or a surfactant package, weighting agent, viscosifier, and fresh water or brine (e.g. sea water). In one non-restrictive version, the surfactant package may include an alkyl polyglycoside and a polyglycerol ester, in one non-restrictive example. The second fluid pill may be a cleaning spacer having a single surfactant or surfactant package and water or brine. The single surfactant or surfactant package of the second fluid pill may be the same or different from the single surfactant or surfactant package of the first fluid pill. In the embodiment where only one pill is used, the pill may contain a single surfactant or a surfactant package, optionally at least one viscosifier, and fresh water or brine (e.g. sea water). Two or more serially pumped pills may be used.

Another optional application of the described spacers is the displacement of a drilling fluid from the annular space in a wellbore ahead of a cement slurry, e.g. as a pre-flush. The aqueous lead spacers may be formulated to minimize mixing between the displaced drilling fluid and a cement slurry, as well as to clean contaminants from the annular space and render the wellbore surfaces water-wet by the generation of the in situ emulsion.

More specifically, contacting the O/SBM with a polar phase (typically water) and the surfactants converts the OBM or SBM into a nanoemulsion, a miniemulsion, a microemulsion (Winsor III) and/or single phase microemulsion (SPME), such as Winsor IV or similar chemistry, as will be described in more detail. Single phase microemulsions can be defined as bi-continuous, oil in water (O/W) or water in oil (W/O). In one non-limiting explanation of the inventive phenomenon, an O/W SPME contacts the oil-based mud and forms a water continuous (oil-in-water) microemulsion. This contacting may be accomplished by circulating the well in a normal or conventional fashion, by which is meant pumping fluid through the whole active fluid system, including the borehole and all the surface tanks that constitute a primary system. In some non-limiting embodiments, benefits may be achieved without circulating the well or without substantially circulating the well, but it is expected that in many cases circulating the well may improve overall results. As noted, it has also been discovered that the microemulsion, miniemulsion, or nanoemulsion may be formed in situ downhole. That is, it is not necessary to form the microemulsion on the surface and pump it downhole.

With more particularity, the methods and compositions herein involve using an in situ formed fluid such as a microemulsion for removing oil-based mud (OBM) or synthetic oil-based mud (SBM), which includes residual oily debris formed by these muds, and other contaminants, such as from barite weighting agents, and reversing the wettability from oil-wet to water-wet of these surfaces and particles and removing or minimizing wellbore damage in oil wells drilled with SBMs or OBMs. The in situ fluid (e.g. microemulsion, nanoemulsion, etc.) may be formed when at least one surfactant and a polar phase (usually, but not limited to water) contacts the OBM or SBM and solubilizes the non-polar material of the O/SBM. It should be understood herein that the term OBM encompasses SBMs.

One of the benefits of the in situ fluid formation is that the cleaning fluid does not require any oil or solvent in the formulation, which gives a higher capacity for oil incorporation or cleaning capability when contacted with the OBM or SBM downhole. Another benefit is that solid particles and other contaminants, if present, are converted from oil-wet to water-wet. As the OBM (or SBM) is contacted and the particulates and debris are converted from oil-wet to water-wet during the in situ formation of a fluid, such as a microemulsion or nanoemulsion, the surfactant or blend of surfactants and a polar phase (e.g. water) may also contain one or more viscosifier. In many cases, the surfactant may be a surfactant blend and often a surfactant-cosurfactant mixture, in which the co-surfactant is a short amphiphilic substance such as an alcohol (in non-limiting examples, propanol, butanol, pentanol in their different isomers) as well as glycols, and ethoxyated and propoxylated alcohols or phenols.

It will be appreciated that it is not necessary for all of the OBM or SBM or all of the contaminant particles to be removed for the inventive method and its compositions to be considered successful. Success is obtained if more O/SBM, particles and other contamination are removed using the in situ fluid (e.g. single phase microemulsion) than if it is not used. Alternatively, the methods and compositions herein may be considered successful if at least a portion of the O/SBM, debris and other contamination is removed. In one non-limiting embodiment at least a majority (>50%) of the O/SBM, debris, and/or other contaminants are removed—this is considered substantial removal in this context. In general, of course, it is desirable to remove as much of the OBM/SBM, contamination and debris as possible.

The methods and compositions herein have the advantages of reduced potential damage to the well, by avoiding plugging of completion equipment (stand alone screens, expandable screens, gravel packs, etc.) by residual debris, and consequently increased hydrocarbon recovery, and/or increased water injection rate, as compared with an otherwise identical method and composition absent the in situ fluid (e.g. SPMEs). Microemulsions are thermodynamically stable, macroscopically homogeneous mixtures of at least three components: a polar phase and a nonpolar phase (usually, but not limited to, water and organic phase, respectively) and at least one surfactant, often more than one surfactant, for instance with a cosurfactant such as an alcohol, glycol or phenol, or their alkoxy derivatives, particularly when ionic surfactants are used, as mentioned in the reference: J. L. Salager and R. E. Anton, "Ionic Microemulsions", Chapter 8, in P. Kumar and K. L. Mittal, ed. *Handbook of Microemulsion Science and Technology*, Marcel Dekker Inc. New York 1999, pp. 247-280. Microemulsions form spontaneously and differ markedly from the thermodynamically unstable macroemulsions, which depend upon intense mixing energy for their formation. Microemulsions are well known in the art, and attention is respectfully directed to S. Ezrahi, A. Aserin and N. Garti, "Chapter 7: Aggregation Behavior in One-Phase (Winsor IV) Microemulsion Systems", in P. Kumar and K. L. Mittal, ed., *Handbook of Microemulsion Science and Technology*, Marcel Dekker, Inc., New York, 1999, pp. 185-246.

The referenced chapters describe the types of microemulsion phase formulations defined by Winsor: Winsor I, Winsor II and Winsor III. A system or formulation is defined as: Winsor I when it contains a microemulsion in equilibrium with an excess oil phase; Winsor II when it contains a microemulsion in equilibrium with excess water; and Winsor III when it contains a middle phase microemulsion in equilibrium with excess water and excess oil. The author also describes Winsor IV as a single-phase microemulsion, with no excess oil or excess water. Although not wishing to be limited by any one theory, it is believed that the microemulsions formed in the methods and compositions of the present method are of the Winsor IV type, which means substantially the entire spacer system is a microemulsion phase. By "substantially" is meant in one non-limiting embodiment more than 50% of the spacer system, and alternatively in another non-restrictive version, more than 50% of the spacer system. The thermodynamically stable single phase Winsor IV microemulsion and could evolve by a change in formulation or composition into the formation of a miniemulsion or nanoemulsion, which is a two-phase system with submicron size droplets which could be stable for long period of time, but not permanently stable as a microemulsion, as explained in reference J. L. Salager, "Emulsion Phase Inversion Phenomena" in *Emulsions and Emulsion Stability*, J. Sjoblöm Ed., $2^{nd}$ Edition, Chap. 4, pp. 185-226, Taylor and Francis, London (2006).

Surfactants suitable for creating the in situ fluids (e.g. single phase microemulsions) using these methods herein include, but are not necessarily limited to non-ionic, anionic, cationic and amphoteric surfactants and in particular, blends thereof. Co-solvents or co-surfactants such as alcohols are optional additives used in the microemulsion formulation. Suitable nonionic surfactants include, but are not necessarily limited to, alkyl polyglycosides, sorbitan esters, methyl glucoside esters, alcohol ethoxylates, or polyglycol esters. In one non-restrictive version, polyglycol esters are particularly suitable. Suitable cationic surfactants include, but are not necessarily limited to, arginine methyl esters, alkanolamines and alkylenediamides. Suitable anionic surfactants include, but are not necessarily limited to, alkali metal alkyl sulfates, alkyl or alkylaryl sulfonates, linear or branched alkyl ether sulfates and sulfonates, alcohol polypropoxylated and/or polyethoxylated sulfates, alkyl or alkylaryl disulfonates, alkyl disulfates, alkyl sulphosuccinates, alkyl ether sulfates, linear and branched ether sulfates, and mixtures thereof. In one non-limiting embodiment at least two surfactants in a blend may be used to create single phase microemulsions in situ, as well as the other in-situ fluids. Suitable surfactants may also include surfactants containing a non-ionic spacer-arm central extension and an ionic or nonionic polar group. The non-ionic spacer-arm central extension may be the result of polypropoxylation, polyethoxylation, or a mixture of the two, in non-limiting embodiments.

Other surfactants suitable for the methods and compositions herein include, but are not limited to, those discussed in: M. J. Rosen, *Surfactants and Interfacial Phenomena*, Second Edition, John Wiley & Sons Inc., 1989; and K. Holmber, "Novel Surfactants" in *Surfactant Science Series*, Vol. 74, Marcel Dekker Inc, New York, 1998.

In another non-restrictive embodiment herein, the in situ fluid formulation (e.g. macroemulsion, nanoemulsion, etc.) may contain a co-surfactant which may be an alcohol having from about 3 to about 10 carbon atoms, in another non-limiting embodiment from about 4 to about 6 carbon atoms. A specific example of a suitable co-surfactant includes, but is not necessarily limited to butanol. These co-surfactants may be alkoxylated, e.g. ethoxylated and/or propoxylated, although in most cases sufficient ethoxylation should be present to accomplish the purposes of the methods. In one non-restrictive embodiment the number of ethoxy units ranges from about 3 to about 15, alternatively from about 6, independently up to about 10.

In one non-restrictive version, an optional co-surfactant may be employed. The proportion of co-surfactant to be used with the surfactant is difficult to specify in advance and in general, and may be influenced by a number of interrelated factors including, but not necessarily limited to, the nature of the surfactant, the nature of the co-surfactant, the type of drilling fluid being removed, displaced or otherwise affected, wellbore conditions, and the like. In one non-limiting embodiment, a suitable spacer fluid includes a surfactant blend of polyglycoside and polyglycerol ester (such as PG 8-10 ester available from Oleon N.V.) that has a molar ratio of free OH/esterified OH of 3.4/1, optionally with an alkyl alcohol ethoxylated with 7.5 or higher EO.

In another non-limiting embodiment, the in situ fluid (e.g. single phase microemulsion) contains a non-polar liquid, which may include a synthetic fluid including, but not necessarily limited to, ester fluids; paraffins (such as PARA-TEQ™ fluids from Baker Hughes Drilling Fluids) and isomerized olefins (such as ISO-TEQ™ from Baker Hughes Drilling Fluids). However, diesel and mineral oils such as ESCAID 110 (from Exxon) or EDC 99-DW oils (from TOTAL) can also be used as a non-polar liquid in preparing the fluid systems herein. Other suitable non-polar liquids include, but are not necessarily limited to, limonene, xylene, mutual solvents, and the like. As noted previously, an advantage of forming the fluids (e.g. nanoemulsion, single phase microemulsion, etc.) in situ is that less non-polar liquid needs to be used (as compared with a pre-formed microemulsion) since the non-polar liquid is found in the OBM (or SBM) itself. This gives a higher capacity for the microemulsion, e.g., to absorb the oil.

In the non-limiting case where two fluid pills are used sequentially, the first pill may be a weighted drive spacer which contains one or more weighting agents. Weighting agents are high-specific gravity and finely-divided solid materials used to increase density. Suitable weighting agents include, but are not necessarily limited to, barite, hematite, ilemite, siderite, and the like.

The fluid pills herein, the weighted drive spacer, and other pills may also contain at least one viscosifier. A viscosifier is a component that increases the viscosity of the fluid pill. Suitable viscosifiers include, but are not necessarily limited to, hydratable polysaccharides, such as xanthan gum (which may or may not be crosslinked), hydroxyethylcellulose (HEC), or carboxymethylcellulose (CMC), viscoelastic surfactants, synthetic polymers, such as polyacrylamides, copolymers of acrylic acid and acrylamide, polyacrylates, clays such as bentonite, sepiolite, and attapulgite and the like and mixtures thereof.

It will be appreciated that the amount of in situ fluid to be created or formed and the amounts of in situ-forming components (polar component and a surfactant and co-surfactant, if present) to be added or included are difficult to determine and predict in general and in advance with much accuracy since they are dependent upon a number of interrelated factors including, but not necessarily limited to, the brine type; the O/SBM type; the temperature of the formation; the particular surfactant or surfactant blend used; the particular co-surfactant used, if present; etc. Nevertheless, in order to give some idea of the quantities used, in one non-limiting embodiment, the proportion of non-aqueous components in the in-situ fluid (e.g. single phase microemulsion) may range from about 1 to about 50 volume %, and in another non-limiting embodiment may range from about 5 independently up to about 20 volume %.

It is expected that brine will be a common component of the in situ fluid (e.g. SPME), and any of the commonly used brines, and salts to make them, are expected to be suitable in the compositions and methods herein. Although water is expected to be the polar liquid used to make the microemulsions in situ, it will be appreciated that other polar liquids such as alcohols and glycols, alone or together with water, may be used.

With further specificity, the methods and compositions herein may concern one-trip clean up spacers designed to physically change an OBM (e.g. an invert emulsion). The inventive method physically changes the nature of the O/SBM; any resulting oil components or debris which are incorporated into the SPME (e.g.) formation in situ and are then further micro-emulsified or absorbed. With the conversion of the external oil to internal emulsified oil in water, plus the converting oil-wet particles to water-wet particles, most of the O/SBM and any remaining debris or contaminants are either removed or micro-sized to the extent that only a minimal or reduced amount of damaging components remain on a reservoir face.

In another non-limiting embodiment, the salts suitable for use in creating the brine include, but are not necessarily limited to, sodium chloride, potassium chloride, calcium chloride, sodium bromide, calcium bromide, zinc bromide, sodium formate, potassium formate, cesium formate and combinations thereof. The density of the brines may range from about 8.4 lb/gal to about 17 lb/gal (about 1 to about 2 kg/liter), although other densities may be given elsewhere herein.

The in situ fluid (e.g. single phase microemulsion) treatment may be composed of different brine and oil blends. The composition depends upon the required density and formulation of the spacer fluids used.

This technology does not require or discriminate against any invert emulsion. In other words, the single phase microemulsion can be applied to displacement or clean up for any OBM system regardless of base oil type or emulsifier used to formulate the mud. This versatility allows an operator flexibility to formulate the drilling fluid based on wellbore needs. This is not the case in some prior methods whereby highly specific amine emulsifiers are needed because they require acid protonation to reverse the wettability. In one non-limiting embodiment the methods and compositions are practiced in the absence of amine emulsifiers, such as resin amines and/or amine emulsifiers of the formula R—N—[(CH$_2$CH$_2$R'A)$_x$H]$_2$.

Another important feature relative to other OBM or invert emulsion removal methods is that the oil phase of the OBM emulsion is solubilized into the single phase microemulsion (or in other in situ fluid, such as nanoemulsion, miniemulsion or other emulsion formation). The inventive treatment process reduces the energy necessary for the microemulsion to form when compared to previous methods. This efficiency reduces the number of pipe trips and decreases the time required to complete the well.

The invention will now be further discussed with respect to actual implementation of the invention in Examples which are not intended to limit the invention, but simply to further illustrate it. Again, while the in situ fluid may be referred to as a "microemulsion" or "single phase microemulsion", it should be appreciated that the methods and compositions are expected to apply to other in situ fluids including, but not limited to miniemulsions, nanoemulsions, and all types of microemulsions.

EXAMPLES

Microemulsion technology (in-situ SPME) has been developed to formulate very efficient spacer products designated herein as Spacer Fluid A. The microemulsion technology of the methods and compositions herein uses the combination of surfactants with water/brine and oil that easily cleans the oil, oil mud products, and solids from the casing, tools and other rig components. Additive A and B are surfactant blends as described above which are custom designed to formulate a spacer fluid to clean synthetic- or oil-base mud residue from casing and risers and water-wet their surfaces. These systems contain no organic solvents or hydrocarbon solvents (at least until the emulsion is formed in situ) and are aqueous based.
Displacement Procedures
Additive A This additive is designed to be used in a spacer fluid to push and clean the O/SBM out of the casing and initiate the cleaning process without the use of solvents. Displacing a fluid system from a wellbore is best accomplished by utilizing a high pump rate, pipe rotation and a viscous, weighted spacer. The high viscosity helps maintain the integrity of the spacer by enabling it to stay in "plug" or laminar flow at high pump rates. The spacer may be large enough to allow for 5 to 10 minutes contact time based on the pump rate. Pipe rotation helps break up the gelled pockets of mud that may accumulate in some sections of the annulus, especially in highly deviated wellbores. The spacer pumped either in laminar or turbulent flow will remove O/SBM and the residual oil contaminated solids. In one non-limiting embodiment each spacer is circulated in the wellbore to contact the SBM of OBM and cover at least from 500 to 1000 feet (152 to 305 meters) of the annulus at its largest diameter.

The density of this viscous push spacer is usually 0.2 lbs/gal (0.02 kg/liter) over the density of the drilling fluid. Viscosity may be increased using XAN-PLEX® D viscosifier to around 1.5 the Yield Point of the drilling fluid in order to minimize comingling of the two fluids. (XAN-PLEX® D viscosifier is a high molecular weight xanthan gum polysaccharide available from Baker Hughes Drilling Fluids.)

Additive B

Additive B may be used in a spacer fluid that is a near Newtonian fluid that may be pumped in turbulence to clean and water wet all metal surfaces. The spacer fluid including additive B is a tail spacer designed to remove all residual debris and solubles any residual oil or synthetic fluid that remains in the casing and other rig components.

Additive B may be added directly into the mixing pit and stirred gently with a lighting or paddle mixer. The volume is based on the hole configuration—normally 500 feet to 1000 feet (152 to 305 meters) of the largest annular volume and is usually 50 to 100 bbls (8 to 16 m$^3$).

Spacer sequences to displace SBM are summarized in Table I. MIL-BAR® or MIL-CARB high purity weighting agent is available from Baker Hughes Drilling Fluids.

TABLE I

Spacer Sequence for the Displacement of Synthetic Based Mud (SBM)

| | | | |
|---|---|---|---|
| 1 | Spacer fluid A: Displacement spacer | Additive A, make up water, XANPLEX-D, MIL-BAR | YP 1.5-5 x mud Density 0.2-1.0 lb/gal (0.02-0.12 kg/L) over mud wt. 5-10 minute contact time |
| 2 | Spacer fluid B: Cleaning spacer | Additive B, make up brine | 500-1000 ft (152 to 305 m) annular volume 5-10 minute contact time |

Rheological Compatibility

Rheological compatibility tests were conducted for Spacer Fluid A at 40° F. and 150° F. (4° C. and 66° C.). The Experimental Procedure is given below, and the results are given in Tables II and III, and plotted in FIG. 1.

Experimental Procedure 1. 12.0 lb/gal (1.4 kg/L) O/SBM mud was added to stainless steel conical cups measuring 0 vol % (0 mL), 10 vol % (40 mL), 40 vol % (160 mL), 70 vol % (280 mL), 90 vol % (360 mL), and 100 vol % (400 mL) in a graduated cylinder.
2. Each conical cup was filled to a total volume of 400 mL of the spacer fluid being tested.
3. Each sample was mixed at 6000 rpm on a Hamilton Beach mixer for 15 min.
4. The fluid sample was split into 200 mL samples.
5. For testing at 40° F. (4° C.), the samples pre-cooled and then poured into a cooling jacket at a temperature of 35±5° F. (1.7° C.±2.8° C.).
6. For testing at 150° F., the samples pre-heated and then poured into a thermo-cup, with temperature regulated by a thermocouple to 150±5° F. (66±2.8° C.).
7. While the spacer fluid was cooling or heating, the Fann 35 viscometer was maintained at 300 rpm for mixing.
8. When the spacer was cooled to 40° F. (4° C.) or heated to 150° F. (66° C.), Fann readings (600, 300, 200, 100, 6, 3 rpm values) were taken.
9. Ten second and ten minute gels were recorded.

TABLE II

Spacer Fluid A with 12.0 lb/gal (1.4 kg/L) SBM at 40° F. (4° C.)

| | OBM, vol % | | | | | |
|---|---|---|---|---|---|---|
| | 0% | 10% | 40% | 70% | 90% | 100% |
| | Displacement Spacer A, vol % | | | | | |
| | 100% | 90% | 60% | 30% | 10% | 0% |
| 600 rpm | 108 | 117 | 104 | 125 | 141 | 119 |
| 300 rpm | 79 | 87 | 64 | 71 | 84 | 67 |
| 200 rpm | 72 | 68 | 51 | 51 | 65 | 47 |
| 100 rpm | 55 | 49 | 34 | 30 | 39 | 26 |
| 6 rpm | 25 | 19 | 10 | 6 | 12 | 4 |
| 3 rpm | 22 | 16 | 8 | 6 | 11 | 3 |
| Plastic Viscosity, cP | 29 | 30 | 40 | 54 | 57 | 52 |
| Yield Point, lb/100 ft$^2$ | 50 | 57 | 24 | 17 | 27 | 15 |
| (N/m$^2$) | (24) | (28) | (12) | (8.3) | (13) | (7.3) |
| Gels, 10 sec/10 min | 21/26 | 17/22 | 11/13 | 8/11 | 19/27 | 4/8 |

TABLE III

Spacer Fluid A with 12.0 lb/gal (1.4 kg/L) SBM at 150° F. (66° C.)

| | OBM, vol % | | | | | |
|---|---|---|---|---|---|---|
| | 0% | 10% | 40% | 70% | 90% | 100% |
| | Displacement Spacer A, vol % | | | | | |
| | 100% | 90% | 60% | 30% | 10% | 0% |
| 600 rpm | 64 | 62 | 50 | 45 | 62 | 37 |
| 300 rpm | 52 | 50 | 37 | 27 | 39 | 22 |
| 200 rpm | 44 | 42 | 27 | 19 | 30 | 15 |
| 100 rpm | 36 | 34 | 19 | 13 | 21 | 9 |
| 6 rpm | 20 | 17 | 8 | 4 | 15 | 3 |
| 3 rpm | 17 | 13 | 5 | 4 | 15 | 3 |
| Plastic Viscosity, cP | 12 | 12 | 13 | 18 | 23 | 15 |
| Yield Point, lb/100 ft$^2$ | 40 | 48 | 24 | 9 | 16 | 7 |
| (N/m$^2$) | (19) | (23) | (11) | (4.4) | (7.8) | (3.4) |
| Gels, 10 sec/10 min | 18/23 | 17/21 | 8/9 | 5/8 | 18/21 | 5/8 |

These tests, the results of which are plotted in FIG. 1, show no noticeable increase in rheological properties at varying SBM/Spacer blended ratios relative to the rheology of the 100% SBM. These properties thus indicate that the spacer would effectively displace the SBM from the wellbore.

Since the Spacer Fluid B has similar viscosity to water, the rheological evaluation showed very low plastic viscosity and yield point. This should allow for turbulent flow in the wellbore.

Spacer Fluids Effectiveness—Beaker Test

Figure 2:
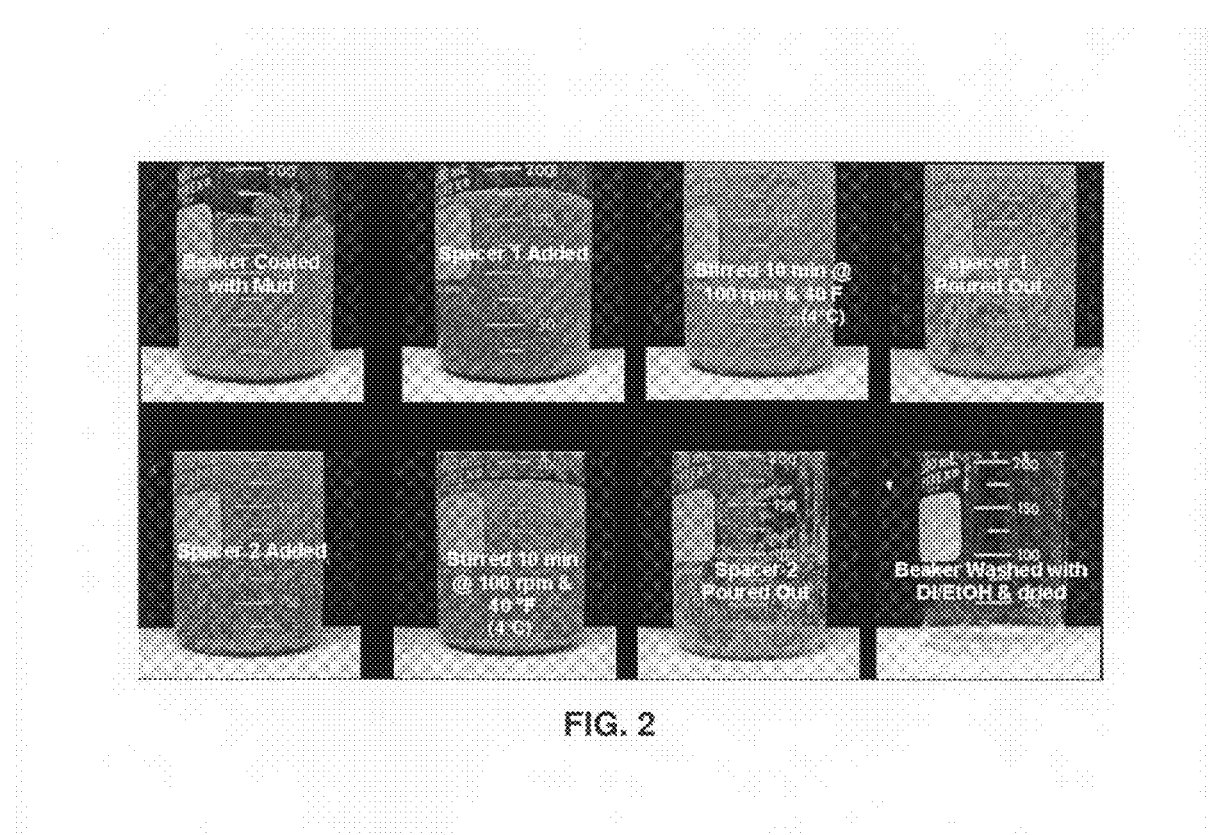
FIG. 2 is a series of eight photographs of a glass beaker used to simulate a borehole wall coated with a synthetic based mud where two different spacer fluids are added and removed to show their effects.

A clear glass beaker was used to simulate a borehole wall in a test to see how the Spacer Fluids A and B removed mud from the surface thereof. The experimental procedure is given below and photographs showing each stage are presented in FIG. 2. Both Spacer Fluids were found to be effective at removing mud from the beaker. Note the clarity of the beaker in the last two photographs compared to the first photograph.

Experimental Procedure for Beaker Test

1. Weigh a 400 mL beaker and coat the beaker with 2 grams of a conventional SBM.
2. Add the Spacer Fluid A in the SBM-coated beaker and run for 10 minutes at 100 rpm on a Fann viscometer.
3. Pour out Spacer Fluid A.
4. Place the Spacer Fluid B in the beaker and run for 10 minutes at 100 rpm.
5. Remove the Spacer Fluid B. Rinse very gently the beaker with deionized water and ethanol.

6. Dry in a vacuum oven for 30 minutes (at 75° F. (24° C.)).
7. Re-weigh the beaker to determine the amount of SBM removed. This test was run at both 40° F. and 150° F. (4 and 55° C.).

In the foregoing specification, the invention has been described with reference to specific embodiments thereof, and has been suggested as effective in providing effective methods and compositions for removing oil-based and synthetic-based muds from a hydrocarbon wellbore. However, it will be evident that various modifications and changes may be made thereto without departing from the broader spirit or scope of the invention as set forth in the appended claims. Accordingly, the specification is to be regarded in an illustrative rather than a restrictive sense. For example, specific combinations of single phase microemulsion-forming components and other components for forming the in situ fluids, such as surfactants, solvents, non-polar liquids, etc. and proportions thereof falling within the claimed parameters, but not specifically identified or tried in a particular composition to improve the removal of oil- or synthetic-based muds herein, are anticipated to be within the scope of this invention.

The present invention may suitably comprise, consist or consist essentially of the elements disclosed and may be practiced in the absence of an element not disclosed.

The words "comprising" and "comprises" as used throughout the claims is to interpreted "including but not limited to".

What is claimed is:

1. A method of removing at least a portion of oil-based mud or synthetic-based mud (O/SBM) from a wellbore comprising:
    drilling a wellbore with an O/SBM, which drilling forms contaminants and residual oily debris in the wellbore;
    pumping a fluid pill into the wellbore, where the fluid pill comprises:
        at least one surfactant; and
        water or brine;
    forming a Winsor IV microemulsion in situ in the wellbore; and
    contacting the O/SBM contaminants and residual oily debris with the Winsor IV microemulsion and removing at least a portion of the O/SBM contaminants and residual oily debris contacted with the Winsor IV microemulsion from the wellbore.

2. The method of claim 1 where the at least one surfactant is selected from the group consisting of non-ionic surfactants, anionic surfactants, cationic surfactants and amphoteric surfactants, surfactants containing a non-ionic spacer-arm central extension and an ionic or nonionic polar group, and mixtures thereof.

3. The method of claim 2 where:
    the nonionic surfactants are selected from the group consisting of alkyl polyglycosides, sorbitan esters, methyl glucoside esters, alcohol ethoxylates, and polyglycol esters;
    the anionic surfactants are selected from the group consisting of alkali metal alkyl sulfates, alkyl or alkylaryl sulfonates, linear or branched alkyl ether sulfates and sulfonates, alcohol polypropoxylated and/or polyethoxylated sulfates, alkyl or alkylaryl disulfonates, alkyl disulfates, alkyl sulphosuccinates, alkyl ether sulfates, linear and branched ether sulfates; and
    the cationic surfactants are selected from the group consisting of arginine methyl esters, alkanolamines, and alkylenediamides, and mixtures thereof.

4. The method of claim 1 where the water in the fluid pill comprises brine selected from the group consisting of halide brines, formate brines and mixtures thereof.

5. The method of claim 1 where the in situ Winsor IV microemulsion is a macroscopically homogeneous mixture of at least three components, where the three components comprise a polar phase from the water or brine, a nonpolar phase from the O/SBM contaminants and residual oily debris, and the at least one surfactant.

6. The method of claim 1 further comprising pumping a cement slurry into the wellbore subsequent to forming the emulsion in situ.

7. The method of claim 1 where the fluid pill is a first fluid pill that is a drive weighted spacer comprising:
    at least one weighting agent;
    the at least one surfactant; and
    the water or brine;
and the method further comprises pumping a second fluid pill into the wellbore subsequent to the first fluid pill, where the second fluid pill comprises:
    at least one surfactant; and
    water or brine.

8. The method of claim 1 where the fluid pill additionally comprises at least one viscosifier.

9. A method of removing at least a portion of oil-based mud or synthetic-based mud (O/SBM) from a wellbore comprising:
    drilling a wellbore with an O/SBM, which drilling forms contaminants and residual oily debris in the wellbore;
    pumping a first fluid pill into the wellbore, where the first fluid pill is a drive weighted spacer comprising:
        at least one weighting agent;
        at least one surfactant;
        at least one viscosifer; and
        water or brine;
    pumping a second fluid pill into the wellbore subsequent to the first fluid pill, where the second fluid pill comprises:
        at least one surfactant; and
        water or brine;
    forming a Winsor IV single phase microemulsion (SPME) in situ in the wellbore; and
    contacting the O/SBM contaminants and residual oily debris with the Winsor IV SPME and substantially removing at least a portion of the O/SBM contaminants and residual oily debris contacted with the Winsor IV SPME from the wellbore.

10. The method of claim 9 where the at least one surfactant is selected from the group consisting of non-ionic surfactants, anionic surfactants, cationic surfactants and amphoteric surfactants, surfactants containing a non-ionic spacer-arm central extension and an ionic or nonionic polar group, and mixtures thereof.

11. The method of claim 10 where:
    the nonionic surfactants are selected from the group consisting of alkyl polyglycosides, sorbitan esters, methyl glucoside esters, alcohol ethoxylates, and polyglycol esters;
    the anionic surfactants are selected from the group consisting of alkali metal alkyl sulfates, alkyl or alkylaryl sulfonates, linear or branched alkyl ether sulfates and sulfonates, alcohol polypropoxylated and/or polyethoxylated sulfates, alkyl or alkylaryl disulfonates, alkyl disulfates, alkyl sulphosuccinates, alkyl ether sulfates, linear and branched ether sulfates; and
    the cationic surfactants are selected from the group consisting of arginine methyl esters, alkanolamines, and alkylenediamides, and mixtures thereof.

12. The method of claim 9 where the water in the first and/or second fluid pill comprises brine.

13. The method of claim 9 where the in situ Winsor IV SPME is a macroscopically homogeneous mixture of at least four components, where the four components comprise a polar phase from the water or brine, a nonpolar phase from the O/SBM contaminants and residual oily debris, the at least one viscosifier and the at least one surfactant.

14. The method claim 9 where the first fluid pill and/or second fluid pill further comprises an alkoxylated alcohol co-surfactant.

15. The method of claim 9 further comprising pumping a cement slurry into the wellbore subsequent to forming the emulsion in situ.

\* \* \* \* \*